United States Patent
Lan et al.

(10) Patent No.: US 10,611,244 B2
(45) Date of Patent: Apr. 7, 2020

(54) METHOD FOR PROCESSING THROTTLE CONTROL SIGNAL, ELECTRONIC SPEED REGULATOR, CONTROLLER, AND MOBILE PLATFORM

(71) Applicant: SZ DJI TECHNOLOGY CO., LTD., Shenzhen (CN)

(72) Inventors: Qiu Lan, Shenzhen (CN); Changxing Zhou, Shenzhen (CN); Wanqi Liu, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 222 days.

(21) Appl. No.: 15/725,863

(22) Filed: Oct. 5, 2017

(65) Prior Publication Data
US 2018/0043780 A1    Feb. 15, 2018

Related U.S. Application Data

(63) Continuation of application No. PCT/CN2016/074857, filed on Feb. 29, 2016.

(51) Int. Cl.
*B60L 3/00* (2019.01)
*B64D 31/00* (2006.01)
(Continued)

(52) U.S. Cl.
CPC ........ *B60L 3/0084* (2013.01); *B60K 31/0058* (2013.01); *B60L 3/0092* (2013.01);
(Continued)

(58) Field of Classification Search
CPC ........ B60L 3/0084; B60L 3/0092; B60L 3/04; B60K 31/0058; B60W 10/08;
(Continued)

(56) References Cited

U.S. PATENT DOCUMENTS 7,130,728 B2 * 10/2006 Suzuki .................... B60T 8/885
701/41
8,358,578 B2 * 1/2013 Murashige ........ H04L 12/40176
370/225

(Continued)

FOREIGN PATENT DOCUMENTS

CN            88102523 A      11/1988
CN             1550087 A      11/2004
(Continued)

OTHER PUBLICATIONS

World Intellectual Property Organization (WIPO) International Search Report for PCT/CN2016/074857 dated Nov. 23, 2016 6 Pages.
(Continued)

*Primary Examiner* — Nicholas Kiswanto
(74) *Attorney, Agent, or Firm* — Anova Law Group, PLLC

(57) ABSTRACT

A method for processing a throttle control signal includes monitoring a signal transmission state of a throttle signal interface of an electronic speed regulator, determining that the signal transmission state is abnormal, and receiving the throttle control signal via a communication interface of the electronic speed regulator if the signal transmission state is determined to be abnormal.

20 Claims, 4 Drawing Sheets

Monitor a signal transmission state for a throttle signal interface in real time    ⟶ 201

Transmit a throttle control signal transmission fault message via a communication interface if the signal transmission state of the throttle signal interface is an abnormal state    ⟶ 202

Receive a throttle control signal via the communication interface    ⟶ 203

(51) Int. Cl.
  *B64D 31/08* (2006.01)
  *B64D 31/06* (2006.01)
  *B60K 31/00* (2006.01)
  *B60L 3/04* (2006.01)
  *B60W 10/08* (2006.01)
  *F16H 61/12* (2010.01)
  *B60W 50/00* (2006.01)

(52) U.S. Cl.
  CPC .............. *B60L 3/04* (2013.01); *B60W 10/08* (2013.01); *B64D 31/00* (2013.01); *B64D 31/06* (2013.01); *B64D 31/08* (2013.01); *F16H 61/12* (2013.01); *B60W 2050/0043* (2013.01)

(58) Field of Classification Search
  CPC .......... B60W 2050/0043; B64D 31/00; B64D 31/06; B64D 31/08
  See application file for complete search history.

(56) References Cited

U.S. PATENT DOCUMENTS

| | | | | |
|---|---|---|---|---|
| 9,550,499 B2* | 1/2017 | Sakai | ................... | G05B 9/02 |
| 2008/0002571 A1* | 1/2008 | Maeda | ................ | H04L 1/22 |
| | | | | 370/225 |

FOREIGN PATENT DOCUMENTS

| | | | |
|---|---|---|---|
| CN | 1798059 | A | 7/2006 |
| CN | 101169076 | A | 4/2008 |
| CN | 101909942 | A | 12/2010 |
| CN | 202168025 | U | 3/2012 |
| CN | 102426457 | A | 4/2012 |
| CN | 103362678 | A | 10/2013 |
| CN | 203289361 | U | 11/2013 |
| CN | 104756394 | A | 7/2015 |
| CN | 205469847 | U | 8/2016 |
| JP | 2000244520 | A | 9/2000 |
| KR | 20100019070 | A | 2/2010 |
| WO | 2008097319 | A2 | 8/2008 |

OTHER PUBLICATIONS

Yang Chen, Research on Fault-tolerant Flight Control of Hexa-copters, Master Thesis in Control Theory and Control Engineer, Nanjing University of Aeronautics and Astronautics, Feb. 2015, China.

* cited by examiner

Transmit a throttle control signal via the communication interface ~ 401

The electronic speed regulator receives the throttle control signal via the communication channel if the signal transmission state of the throttle signal interface is an abnormal state ~ 501

METHOD FOR PROCESSING THROTTLE CONTROL SIGNAL, ELECTRONIC SPEED REGULATOR, CONTROLLER, AND MOBILE PLATFORM

CROSS-REFERENCE TO RELATED APPLICATION

This is a continuation application of International Application No. PCT/CN2016/074857, filed on Feb. 29, 2016, the entire contents of which are incorporated herein by reference.

TECHNICAL FIELD

The present disclosure relates to the technical field of aircraft, and in particular to a method for processing throttle control signal, an electronic speed regulator, a controller, and a mobile platform.

BACKGROUND

Being one of essential components in an aircraft, an electronic speed regulator, also referred to as an electronic governor or an electronic speed control, is used to drive a motor of the aircraft to rotate, to implement start-stop operation and speed regulation for the aircraft.

In conventional technologies, a throttle control line is arranged between the electronic speed regulator and an aircraft controller, through which the controller may transmit a throttle control signal, mostly as a Pulse Width Modulation (PWM) wave or a Pulse Position Modulation (PPM) wave, to the electronic speed regulator during flight. Upon receiving the throttle control signal, the electronic speed regulator may control the motor rotation according to the throttle control signal, implementing flight maneuvers.

A drawback in the conventional technologies is that, in practical application, the throttle control signal received by the electronic speed regulator may be abnormal, for reasons such as damaged wirings. For example, the throttle control signal may be lost or have an unstable signal frequency. As a result, the electronic speed regulator may not be able to properly control the motor rotation. Sometimes in severe cases, flight accidents may be caused.

SUMMARY

In accordance with the disclosure, there is provided a method for processing a throttle control signal including monitoring a signal transmission state of a throttle signal interface of an electronic speed regulator, determining that the signal transmission state is abnormal, and receiving the throttle control signal via a communication interface of the electronic speed regulator if the signal transmission state is determined to be abnormal.

Also in accordance with the disclosure, there is provided an electronic speed regulator including a throttle signal interface configured to receive a throttle control signal, a communication interface configured to transmit communication data, a monitoring circuit configured to monitor a signal transmission state of the throttle signal interface, and a processor configured to receive the throttle control signal via the communication interface when the signal transmission state detected by the monitoring circuit is abnormal.

Also in accordance with the disclosure, there is provided a mobile platform including a motor, a controller, an electronic speed regulator coupled to the motor, a throttle channel between the controller and the electronic speed regulator for transmitting a throttle control signal, and a communication channel between the electronic speed regulator and the controller for transmitting communication data. The electronic speed regulator is configured to receive the throttle control signal via the communication channel when a signal transmission state of the throttle channel is abnormal.

REFERENCE NUMERALS

1—Electronic speed regulator; 11—Processor; 12—Throttle signal interface; 13—The communication interface;

2—Controller; 21—Processor; 22—Throttle signal interface; 23—The communication interface; 3—Motor

DESCRIPTION OF EMBODIMENTS

Hereinafter, technical solutions of the present disclosure will be described in more detail with reference to accompanying drawings. Obviously, the described embodiments are only some, rather than all, embodiments of the present disclosure. Any and all other embodiments obtained by persons of ordinary skill in the art based on the presently disclosed embodiments without making any creative effort shall fall into the scope of the present disclosure.

Unless otherwise defined, all technical and scientific terms used herein carry the same meanings as those commonly understood by those skilled in the art pertaining to the present disclosure. The terms as used in the description of the present disclosure are merely for the purpose of describing specific embodiments, rather than for limiting the present disclosure. The term "and/or" used herein includes any and all combinations of one or more related listed items.

In the following, some embodiments of the present disclosure will be explained in detail in conjunction with the accompany drawings. The embodiments and the features therein may be combined with each other, as long as incompatibility does not entail.

Exemplary methods consistent with embodiments of the disclosure for processing a throttle control signal will be described. The methods can be implemented in an electronic speed regulator.

Figure 1:
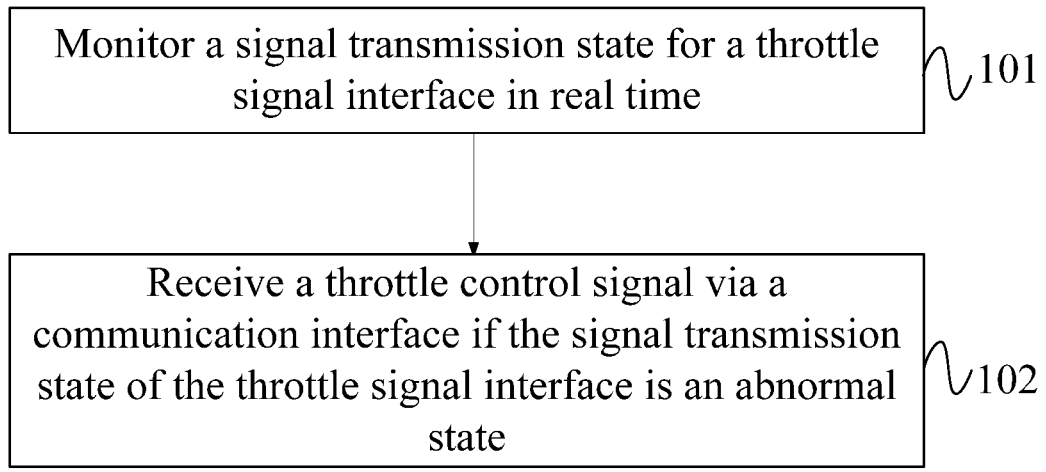
FIG. 1 is a flow diagram of a method for processing throttle control signal according to an exemplary embodiment of the present disclosure.

FIG. 1 is a flow diagram of an exemplary method for processing throttle control signal consistent with embodiments of the present disclosure. As shown in FIG. 1, at 101, a signal transmission state of a throttle signal interface is monitored in real time.

As noted above, the method consistent with embodiments of the disclosure may be adapted to an electronic speed regulator. The electronic speed regulator may receive a throttle control signal transmitted from a controller of an unmanned aircraft, and control motor rotation of the aircraft according to the throttle control signal, realizing proper flight of the aircraft.

Figure 2:
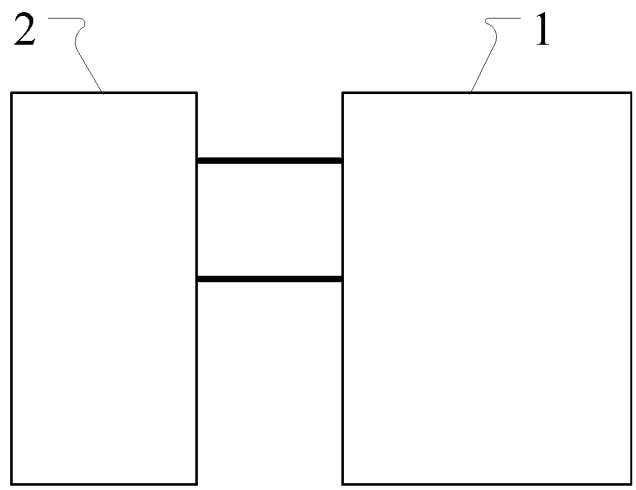
FIG. 2 is a schematic diagram of a coupling between an electronic speed regulator and a controller in a method for processing throttle control signal according to an exemplary embodiment of the present disclosure.

FIG. 2 is a schematic diagram showing the coupling between an electronic speed regulator 1 and a controller 2 consistent with embodiments of the present disclosure. As shown in FIG. 2, two channels may be arranged between the electronic speed regulator 1 and the controller 2, one of which is a throttle channel, and another is a communication channel.

The throttle channel may be used to transmit a throttle control signal, which may be, for example, a Pulse Width Modulation (PWM) signal or a Pulse Position Modulation (PMM) signal.

The communication channel may be used for transmitting communication data. For example, the controller 2 may transmit an executable file or a debugging parameter to the electronic speed regulator 1 via the communication channel, thereby enabling the electronic speed regulator 1 to implement functions such as firmware upgrade and parameter modification, etc. Via the communication channel, the electronic speed regulator 1 may transmit to the controller 2 operation data related to an operation state, as well as operation state data of the electronic speed regulator 1 itself, etc.

The electronic speed regulator 1 may be arranged with a throttle signal interface for receiving a throttle control signal, and a communication interface for transmitting communication data. The controller 2 may be arranged with a throttle signal interface for transmitting a throttle control signal, and a communication interface for transmitting communication data. The throttle signal interfaces and the communication interfaces may have a variety of implementation forms, such as a wiring, a circuit board trace, a terminal, a pin, etc., which are not limited in this disclosure.

The throttle channel and the communication channel described above may also have a variety of implementations. For example, the throttle signal interface of the electronic speed regulator 1 may be directly connected with the throttle signal interface of the controller 2 to form the throttle channel. In some other embodiments, the throttle signal interface of the electronic speed regulator 1 may be electrically coupled with the throttle signal interface of the controller 2 via wiring, a circuit board trace, or another component to form the throttle channel. Similarly, the communication interface of the electronic speed regulator 1 may be directly connected with the communication interface of the controller 2 to form the throttle channel. In some other embodiments, the communication interface of the electronic speed regulator 1 may be electrically coupled with the communication interface of the controller 2 via wiring, a circuit board trace, or another component to form the communication channel.

According to the present disclosure, the electronic speed regulator 1 can monitor the signal transmission state of the throttle signal interface in real time. A normal signal transmission state indicates that the throttle signal interface of the electronic speed regulator 1 is receiving a normal throttle control signal. If the signal transmission state is abnormal, the throttle signal interface of the electronic speed regulator 1 is not receiving a normal throttle control signal.

In some embodiments, the abnormal state may be that no throttle control signal is received via the throttle signal interface, or that the throttle control signal received via the throttle signal interface is showing abnormality.

The electronic speed regulator 1 may be equipped with a monitoring circuit for monitoring the signal transmission state of the throttle signal interface. For example, the monitoring circuit may determine whether the throttle control signal of the throttle signal interface is abnormal based on whether characteristic information of the throttle control signal received via the throttle signal interface satisfies a predefined condition. The characteristic information may include frequency information and/or pulse width information of the throttle control signal.

The monitoring circuit may include a voltage detection circuit or a current detection circuit. The voltage detection circuit is used for detecting voltage information of the throttle control signal received via the throttle signal interface, and the current detection circuit is used for detecting current information of the throttle control signal. The monitoring circuit may determine the characteristic information of the throttle control signal based on the voltage information or the current information of the throttle control signal, thereby determining the signal transmission state.

For example, if the monitoring circuit continuously detects zero voltage or zero current for the signal received via the throttle signal interface during a predefined time period, it means no throttle control signal is received via the throttle signal interface.

If the signal received via the throttle signal interface shows a high level every x seconds and each high level lasts y seconds, the characteristic information of the throttle control signal received via the throttle signal interface includes a frequency of $1/x$ Hz and a pulse width of y seconds.

Assuming the predefined condition for the throttle control signal to be in a normal state includes a frequency of the throttle control signal being between a Hz and b Hz, and a pulse width of the throttle control signal being between c seconds and d seconds, then by comparing $1/x$ with a and b, and comparing y with c and d, it may be determined whether the throttle control signal received via the throttle signal interface is in the normal state.

If $1/x$ is not within the range of a to b, or if y is not within the range of c to d, then it can be determined that the throttle control signal received via the throttle signal interface is abnormal.

The correspondence between the characteristic information of the throttle control signal and the signal transmission state may be configured as needed, which is not limited to those described above.

In some embodiments, the signal transmission state of the throttle signal interface may also be determined by another component of the electronic speed regulator 1, which is not limited to that described above.

Referring again to FIG. 1, at 102, the throttle control signal is received via the communication interface if the signal transmission state of the throttle signal interface is an abnormal state.

For example, if the signal transmission state of the throttle signal interface is an abnormal state, the controller 2 may transmit the throttle control signal to the electronic speed regulator 1 via the communication channel. The electronic speed regulator 1 may receive the throttle control signal at the communication interface to control the motor to rotate normally.

The throttle control signal may be transmitted to the throttle signal interface and the communication interface in different forms. The throttle control signal may be transmitted to the throttle signal interface in an analog signal format, such as a PWM signal or a PPM signal etc. The throttle control signal may be transmitted to the communication interface in a digital signal format, such as frequency information or pulse width information of the PWM signal or PPM signal.

After receiving the throttle control signal in the digital signal format, the electronic speed regulator 1 may generate a corresponding PWM signal or PPM signal according to the throttle control signal in the digital signal format, thereby realizing control over the motor.

In some embodiments, the throttle channel and communication channel may both be provided between the electronic speed regulator 1 and the controller 2. The controller 2 may transmit communication data to the electronic speed regulator 1 via the communication channel, enabling the electronic speed regulator 1 to implement functions such as firmware upgrade and parameter update, etc. Under normal conditions, the electronic speed regulator 1 receives the throttle control information transmitted from the controller 2 via the throttle channel to control the motor to rotate normally. When abnormality occurs to the signal transmission state of the throttle signal interface of the electronic speed regulator 1, the electronic speed regulator 1 may still obtain the throttle control signal via the communication interface, thus continuing the control over the motor, ensuring normal flight of the aircraft.

According to the method for processing throttle control signal according to the disclosure, the electronic speed regulator 1 is provided with a throttle signal interface for receiving a throttle control signal and a communication interface for transmitting communication data. Signal transmission state is monitored in real time for the throttle signal interface, and the throttle control signal will be received via the communication interface when the signal transmission state of the throttle signal interface is an abnormal state. As such, the electronic speed regulator can maintain a proper control over motor rotation, preventing the aircraft from losing control over its frame arm dynamics, thereby ensuring the normal flight for, and improving the reliability of, the aircraft.

According to the disclosure, the throttle control signal received by the electronic speed regulator 1 via the communication interface may be transmitted by the controller 2 via the communication channel either after, or both before and after, abnormality occurs in the signal transmission state of the throttle signal interface of the electronic speed regulator 1, as described in more detail below.

In some embodiments, the electronic speed regulator 1 transmits a throttle control signal transmission fault message to the controller 2 when the signal transmission state of the throttle signal interface is abnormal. When receiving the throttle control signal transmission fault message, the controller 2 transmits the throttle control signal to the electronic speed regulator 1 via the communication channel.

Figure 3:
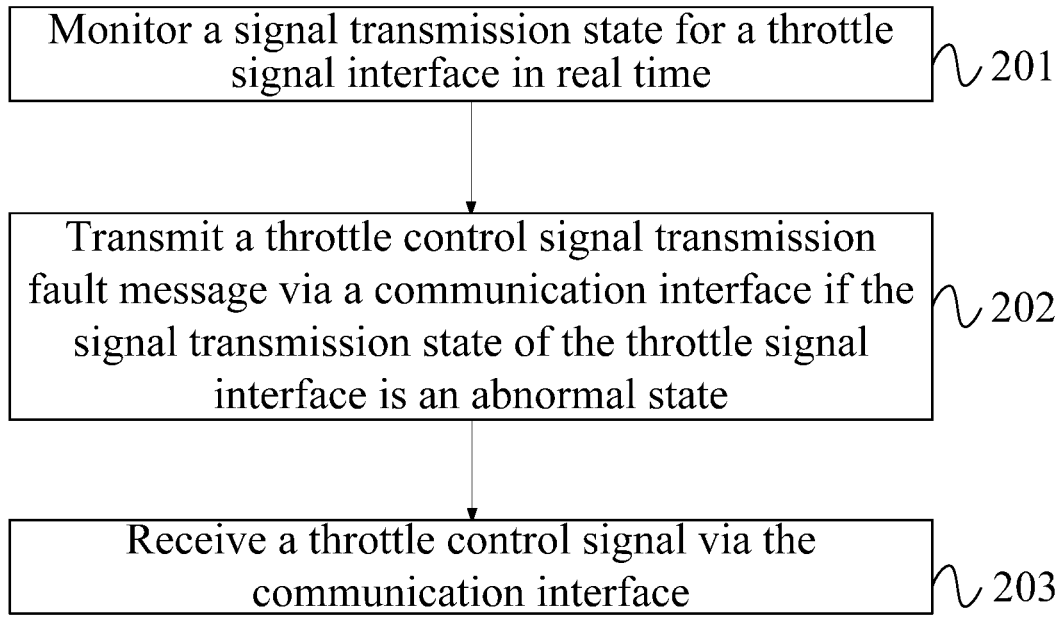
FIG. 3 is a flow diagram of a method for processing throttle control signal according to another exemplary embodiment of the present disclosure.

FIG. 3 is a flow diagram of another exemplary method for processing throttle control signal consistent with embodiments of the present disclosure. As shown in FIG. 3, at 201, a signal transmission state of the throttle signal interface is monitored in real time. Process of 201 is similar to that of 101 described above, and thus detailed description thereof is omitted. In this embodiment, when the signal transmission state of the throttle signal interface is a normal state, the controller 2 transmits the throttle control signal only via the throttle channel, and the electronic speed regulator 1 receives the throttle control signal only via the throttle signal interface. That is, before the signal transmission state of the throttle signal interface becomes abnormal, no throttle control signal is transmitted via the communication channel.

At 202, a throttle control signal transmission fault message is transmitted via the communication interface if the signal transmission state of the throttle signal interface becomes an abnormal state.

In some embodiments, the electronic speed regulator 1 may transmit the throttle control signal transmission fault message via the communication interface, and the controller 2 may receive the throttle control signal transmission fault message via the communication channel. As such, the controller 2 can be timely informed of a fault occurred in the throttle control signal received by the electronic speed regulator 1 at the throttle signal interface.

Further, the controller 2 may transmit the throttle control signal to the electronic speed regulator 1 via the communication channel based on the throttle control signal transmission fault message.

At 203, the throttle control signal is received via the communication interface.

Through 201 and 202, the controller 2 may transmit the throttle control signal via the communication channel when the signal transmission state of the throttle signal interface of the electronic speed regulator 1 is abnormal. The electronic speed regulator 1 may receive the throttle control signal at the communication interface, and control the motor rotation according to the throttle control signal received via the communication interface.

According to the method for processing throttle control signal consistent with embodiments of the disclosure, signal transmission state at the throttle signal interface is monitored in real time, and a throttle control signal transmission fault message is transmitted via the communication interface when the signal transmission state of the throttle signal interface is an abnormal state, so that the controller 2 may be timely informed that the electronic speed regulator 1 has encountered abnormality in receiving the throttle control signal. The controller 2 only needs to transmit the throttle control signal to the electronic speed regulator 1 via the communication channel when abnormality occurs, thereby saving signal resource, effectively conserving battery power for the aircraft, and improving the endurance for the aircraft.

In some embodiments, the cause of the abnormality may be determined based on the received signal if the signal transmission state of the throttle signal interface is an abnormal state.

For example, if the voltage or current of the signal received via the throttle signal interface is low, e.g., much lower than the high level voltage or the high level current of the PWM signal or the PPM signal under normal conditions, this may indicate that the battery level is low. If the voltage or current of the signal received via the throttle signal interface continues to be zero, it may indicate that the throttle channel between the electronic speed regulator 1 and the controller 2 has been disconnected.

According to the cause of the abnormality, the electronic speed regulator 1 may perform corresponding remedial actions. For example, the electronic speed regulator 1 can enable a backup power when the battery level is low. In some embodiments, the throttle control signal transmission fault message transmitted from the electronic speed regulator 1 to the controller 2 may carry an associated fault ID, causing the controller 2 to perform a proper action according to the fault ID. For example, when the throttle channel is disconnected, the controller 2 may transmit information to the user to report the abnormal case.

Through the electronic speed regulator 1 and the controller 2, proper action is taken according to the cause of the abnormality, which more rapidly brings the signal transmission state of the throttle channel back to normal, further improving the reliability of the aircraft.

In some embodiments, when the signal transmission state of the throttle signal interface is back to normal state, the electronic speed regulator 1 may again receive the throttle control signal via the throttle signal interface and continue to control the motor.

Further, if the signal transmission state of the throttle signal interface is back to normal state, the electronic speed regulator 1 may transmit a throttle control signal transmission restored message via the communication interface to the controller 2. After receiving the throttle control signal transmission restored message, the controller 2 may stop transmitting the throttle control signal via the communication interface.

In some embodiments, the controller 2 can transmit the throttle control signal through the throttle channel and the communication channel in parallel before the signal transmission state of the throttle signal interface turns abnormal, i.e., even when the signal transmission state of the throttle signal interface is normal.

Figure 4:
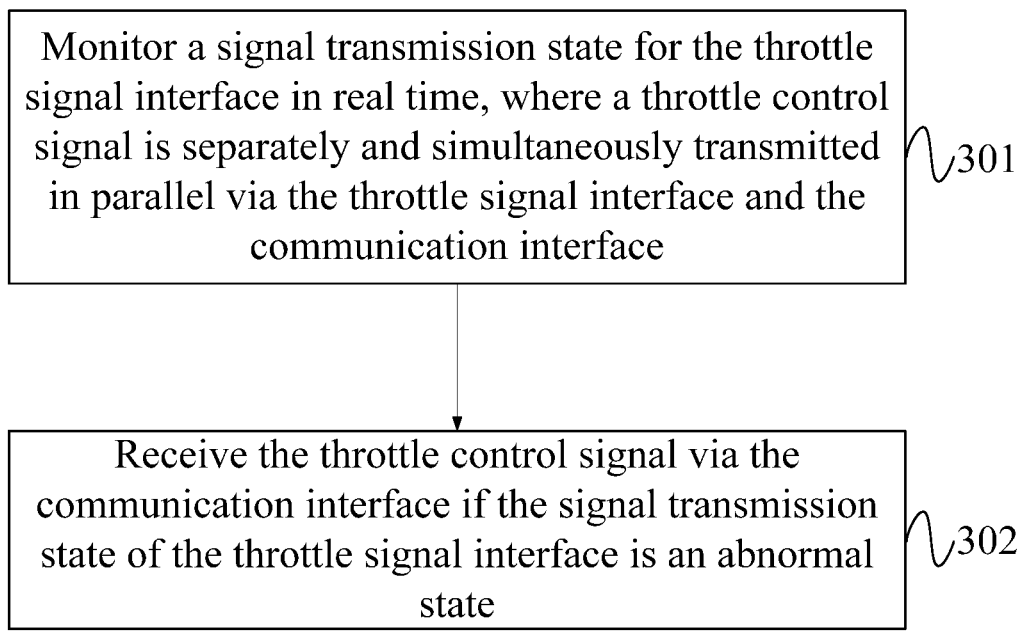
FIG. 4 is a flow diagram of a method for processing throttle control signal according to another exemplary embodiment of the present disclosure.

FIG. 4 is a flow diagram of another exemplary method for processing throttle control signal consistent with embodiments of the present disclosure. As shown in FIG. 4, at 301, the signal transmission state of the throttle signal interface is monitored in real time, where the throttle control signal is separately and simultaneously transmitted in parallel to the throttle signal interface and the communication interface.

In some embodiments, the controller 2 may, during a normal flight course of the aircraft, transmit the throttle control signal via the throttle channel and the communication channel. That is, the electronic speed regulator 1 will always, at any instant, receive the throttle control signal via both the throttle signal interface and the communication interface, regardless of whether the signal transmission state of the throttle signal interface is a normal state.

The throttle control signal may be transmitted to the throttle signal interface and the communication interface in different forms. The throttle control signal may be transmitted to the throttle signal interface in an analog signal format, while to the communication interface in a digital signal format.

At 301, the signal transmission state of the throttle signal interface may be determined in the same manner as that at 101 described above. For example, whether the throttle control signal received via the throttle signal interface shows any abnormality is determined based on whether characteristic information of the throttle control signal received via the throttle signal interface meets a predefined condition.

In some other embodiments, another determination method may be used. For example, the electronic speed regulator 1 may compare the throttle control signal received via the throttle signal interface with the throttle control signal received via the communication interface, and the signal transmission state of the throttle signal interface can be determined to be a normal state if the corresponding frequency information and/or pulse width information matches, or an abnormal state if otherwise.

In some embodiments, different determination methods, such as the exemplary methods described above, may be combined for assessing the signal transmission state of the throttle signal interface, which may further increase the accuracy for the assessment.

For example, the signal transmission state of the throttle signal interface may be determined to be a normal state if the characteristic information of the throttle control signal received via the throttle signal interface satisfies a predefined condition, and the throttle control signal received via the throttle signal interface is consistent with the throttle control signal received via the communication interface. In some other embodiments, the signal transmission state of the throttle signal interface may be determined to be a normal state if the characteristic information of the throttle control signal received via the throttle signal interface satisfies a predefined condition, or if the throttle control signal received via the throttle signal interface is consistent with the throttle control signal received via the communication interface.

At 302, if the signal transmission state of the throttle signal interface is an abnormal state, the throttle control signal is received via the communication interface.

Since the electronic speed regulator 1 receives the throttle control signals from the throttle signal interface and the communication interface simultaneously, it may switch to the communication interface and continue to control the motor rotation using the throttle control signal received via the communication interface when the signal transmission state of the throttle signal interface is abnormal.

In the exemplary method for processing throttle control signal described above, the throttle control signal is simultaneously and separately transmitted in parallel to the throttle signal interface and the communication interface of the electronic speed regulator 1, so that the electronic speed regulator 1 may still receive the throttle control signal via the communication interface even if the signal transmission state of the throttle signal interface is an abnormal state.

Figures 5, 6, 7:
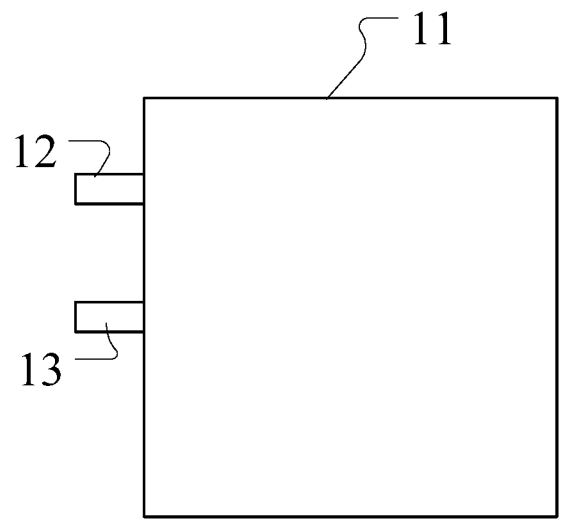
FIG. 5 is a flow diagram of a method for processing throttle control signal according to another exemplary embodiment of the present disclosure.
FIG. 6 is a flow diagram of a method for processing throttle control signal according to another exemplary embodiment of the present disclosure.
FIG. 7 is a schematic structural diagram of an electronic speed regulator according to another exemplary embodiment of the present disclosure.

FIG. 5 is a flow diagram of another exemplary method for processing throttle control signal consistent with embodiments of the present disclosure. As shown in FIG. 5, at 401, the throttle control signal is transmitted via the communication interface.

In some embodiments, the method shown in FIG. 4 may be implemented in a controller, such as the controller 2 shown in FIG. 2. As described above, the controller 2 includes a throttle signal interface for transmitting a throttle control signal, and a communication interface for transmitting communication data. The structure, the connection with the electronic speed regulator 1, and the signal interaction process for the controller 2 are similar to those described above in connection with FIG. 1, and detailed description thereof is omitted.

The controller 2 can transmit a throttle control signal via the communication interface, as described in more detail below.

In some embodiments, the controller can initially transmit the throttle control signal via the throttle signal interface, and then via the communication interface when the signal received at the electronic speed regulator 1 via the throttle signal interface is abnormal. In some embodiments, the process at 401 may include: receiving a throttle control signal transmission fault message via the communication interface, and transmitting the throttle control signal via the communication interface according to the message. Details of this process are similar to those described above in connection with FIG. 3, and thus are not repeated here.

In some embodiments, the controller 2 can receive a throttle control signal transmission recovery message via the communication interface, so as to stop transmission of the throttle control signal via the communication interface according to the throttle control signal transmission recovery message.

In some other embodiments, the controller 2 can transmit a throttle control signal via the throttle signal interface and at the same time transmit the throttle control signal via the communication interface. That is, the throttle control signal is transmitted both via the throttle signal interface and the communication interface simultaneously and separately. Details of this process are similar to those described above in connection with FIG. 4, and thus are not repeated here.

According to the method for processing throttle control signal provided in this embodiment, the controller 2 includes a throttle signal interface for transmitting a throttle control signal and a communication interface for transmitting communication data, and the controller 2 may transmit the throttle signal via the communication interface, enabling the electronic speed regulator 1 to receive the throttle control signal via a communication channel and to continuously control the motor rotation as usual when signal received via the throttle channel is abnormal, preventing the frame arm of the aircraft from losing control over its dynamics, ensuring the normal flight of the aircraft, and improving the reliability of the aircraft.

In some embodiments, the throttle control signals transmitted via the throttle signal interface and the communication interface are in different signal formats. For example, the throttle control signal sent via the throttle signal interface may be an analog signal, and the throttle control signal sent via the communication interface may be a digital signal.

FIG. 6 is a flow diagram of another exemplary method for processing throttle control signal consistent with embodiments of the present disclosure. As shown in FIG. 6, at 501, the electronic speed regulator 1 receives the throttle control signal via the communication channel if the signal transmission state of the throttle signal interface is an abnormal state.

In some embodiments, the method in this embodiment may be implemented in an electronic speed regulator, such as the electronic speed regulator 1, and a controller, such as the controller 2. A throttle channel for transmitting a throttle control signal and a communication channel for transmitting communication data are arranged between the electronic speed regulator 1 and the controller 2. The specific structures, interconnections, and interactions for individual components in this embodiment are similar to those of the foregoing embodiments, and detailed description thereof is omitted.

According to the method for processing throttle control signal provided in this embodiment, a throttle channel for transmitting a throttle control signal and a communication channel for transmitting communication data are arranged between the electronic speed regulator 1 and the controller 2, so that the electronic speed regulator 1 may receive the throttle control signal via the communication channel when the signal transmission state of the throttle channel is an abnormal state, enabling the electronic speed regulator 1 to maintain proper control over motor rotation, preventing the aircraft from losing control over its frame arm dynamics, thereby ensuring the normal flight of, and improving the reliability of, the aircraft.

In some embodiments, the abnormal state may be that no throttle control signal is received via the throttle channel, or that the throttle control signal received via the throttle channel shows abnormality.

In some embodiments, the electronic speed regulator 1 may determine whether the throttle control signal received via the throttle channel is abnormal according to whether the characteristic information of the throttle control signal received via the throttle channel satisfies a predefined condition. The characteristic information may be frequency information and/or pulse width information of the throttle control signal. If the signal transmission state is an abnormal state, the electronic speed regulator 1 may transmit a throttle control signal transmission fault message to the controller 2 via the communication channel, so that the controller 2 may transmit a throttle control signal to the electronic speed regulator 1 via the communication channel upon receiving the throttle control signal fault message.

In some embodiments, the throttle control signal may be simultaneously and separately transmitted in parallel via the throttle channel and the communication channel.

In some embodiments, the throttle control signal may be transmitted via the throttle channel and the communication channel in different forms. For example, the throttle control signal may be transmitted to the throttle channel in an analog signal format, and be transmitted to the communication channel in a digital signal format.

In some embodiments, if the signal transmission state of the throttle channel is back to normal, the electronic speed regulator 1 may receive the throttle control signal via the throttle channel.

FIG. 7 is a schematic structural diagram of an exemplary electronic speed regulator consistent with embodiments of the present disclosure. As shown in FIG. 7, the electronic speed regulator includes:

a processor 11, a throttle signal interface 12 for receiving a throttle control signal, and a communication interface 13 for transmitting communication data.

In some embodiments, the processor 11 receives the throttle control signal via the communication interface 13 when the signal transmission state of the throttle signal interface 12 monitored in real time is an abnormal state.

The electronic speed regulator in this embodiment may be used in performing a method for processing throttle control signal consistent with embodiments of the disclosure, such as the exemplary method described above in connection with FIG. 1. The functions and the implementations of individual component of the electronic speed regulator in this embodiment are similar to those described above in connection with FIG. 1, and thus detailed description thereof is omitted.

The function of the processor 11 may be implemented using software or a hardware module. For example, the characteristic information of the throttle control signal received via the throttle signal interface 12 may be determined using a counter, a timer, and a comparer. The comparer may be used to determine whether the throttle control signal received via the throttle signal interface 12 is abnormal according to whether the characteristic information satisfies a predefined condition. A switch may be used to switch from the throttle signal interface 12 to the communication interface 13 to receive the throttle control signal.

The electronic speed regulator provided in this embodiment includes the processor 11, the throttle signal interface 12 for receiving a throttle control signal, and the communication interface 13 for transmitting communication data. The processor 11 receives the throttle control signal via the communication interface 13 when the signal transmission state of the throttle signal interface 12 is an abnormal state, so as to maintain proper control over motor rotation, preventing the aircraft from losing control over its frame arm dynamics, thereby ensuring the normal flight of, and improving the reliability of, the aircraft.

In some embodiments, the electronic speed regulator may also include a monitoring circuit for monitoring the signal transmission state of the throttle signal interface 12, and the monitoring circuit is communicatively coupled with the processor 11 for transmitting the signal transmission state to the processor 11.

The monitoring circuit may also be implemented in a manner similar to that described above in connection with FIG. 1, and thus detailed description thereof is omitted. The processor 11, the monitoring circuit, the throttle signal interface 12, and the communication interface 13 may be integrated together, i.e., fabricated in a single integrated chip. In some embodiments, the processor 11, the monitoring circuit, the throttle signal interface 12, and the communication interface 13 may be provided separately.

In some embodiments, the abnormal state may be that no throttle control signal is received via the throttle signal interface 12, or that the throttle control signal received via the throttle signal interface 12 shows abnormality.

In some embodiments, the processor 11 may determine whether the throttle control signal received via the throttle signal interface 12 is abnormal according to whether the characteristic information of the throttle control signal received via the throttle signal interface 12 satisfies a predefined condition. If the signal transmission state of the throttle signal interface 12 is an abnormal state, the throttle control signal will be received via the communication interface 13. The characteristic information includes frequency information and/or pulse width information of the throttle control signal.

In some embodiments, the processor 11 may transmit a throttle control signal transmission fault message via the communication interface 13 and receive the throttle control signal via the communication interface 13 when the signal transmission state of the throttle signal interface 12 is an abnormal state.

In some embodiments, the throttle control signal may be simultaneously and separately transmitted in parallel to the throttle signal interface 12 and the communication interface 13.

In some embodiments, the throttle control signal may be transmitted to the throttle signal interface 12 and the communication interface 13 in different forms. For example, the throttle control signal may be transmitted to the throttle signal interface 12 in an analog signal format and the throttle control signal may be transmitted to the communication interface 13 in a digital signal format.

In some embodiments, the processor 11 may revert to receiving the throttle control signal via the throttle signal interface 12 when the signal transmission state of the throttle signal interface 12 is restored to a normal state.

Figure 8:
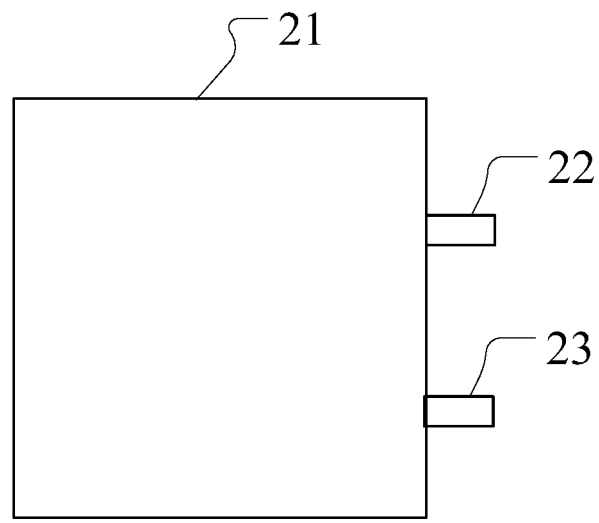
FIG. 8 is a schematic structural diagram of a controller according to an exemplary embodiment of the present disclosure.

FIG. 8 is a schematic structural diagram of an exemplary controller consistent with embodiments of the present disclosure. As shown in FIG. 8, the controller includes a processor 21, a throttle signal interface 22 for transmitting a throttle control signal, and a communication interface 23 for transmitting communication data.

The processor 21 may transmit a throttle control signal via the communication interface 23.

The controller in this embodiment may be used in performing a method for processing throttle control signal consistent with embodiments of the disclosure, such as the exemplary method described above in connection with FIG. 5. The functions and the implementations of individual component of the controller in this embodiment are similar to those described above in connection with FIG. 5, and thus detailed description thereof is omitted.

The controller provided in this embodiment includes the processor 21, the throttle signal interface 22 for transmitting a throttle control signal, and the communication interface 23 for transmitting communication data. The processor 21 may also transmit the throttle signal via the communication interface, enabling an electronic speed regulator to receive the throttle control signal via a communication channel and continue to control the motor rotation as usual when signal received via the throttle channel is abnormal, preventing the frame arm of the aircraft from losing control over its dynamics, ensuring the normal flight of the aircraft, and improving the reliability of the aircraft.

In some embodiments, the controller described in this embodiment may also include a throttle signal generating circuit for generating a throttle control signal. The throttle signal generating circuit is communicatively coupled with the processor 21 for transmitting the generated throttle control signal to the processor 21.

The throttle signal generating circuit may include a switch tube and other components to generate a PWM signal or a PPM signal as the throttle control signal.

The processor 21, the throttle signal generating circuit, the throttle signal interface 22, and the communication interface 23 may be integrated together, i.e., fabricated in a single integrated chip. In some embodiments, the processor 21, the throttle signal generating circuit, the throttle signal interface 22, and the communication interface 23 may be provided separately.

In some embodiments, the processor 21 may receive throttle control signal transmission fault information via the communication interface 23, and transmit the throttle control signal via the communication interface 23 upon receiving the throttle control signal transmission fault information.

In some embodiments, the throttle control signal may be simultaneously and separately transmitted via the throttle signal interface 22 and the communication interface 23.

In some embodiments, the throttle control signal may be transmitted via the throttle signal interface 22 and the communication interface 23 in different forms. For example, the throttle control signal sent via the throttle signal interface 22 may be an analog signal, and the throttle control signal sent via the communication interface 23 may be a digital signal.

In some embodiments, the processor 21 may receive a throttle control signal transmission recovery message via the communication interface 23, so as to stop transmission of the throttle control signal via the communication interface 23 upon receiving the throttle control signal transmission recovery message.

Figure 9:
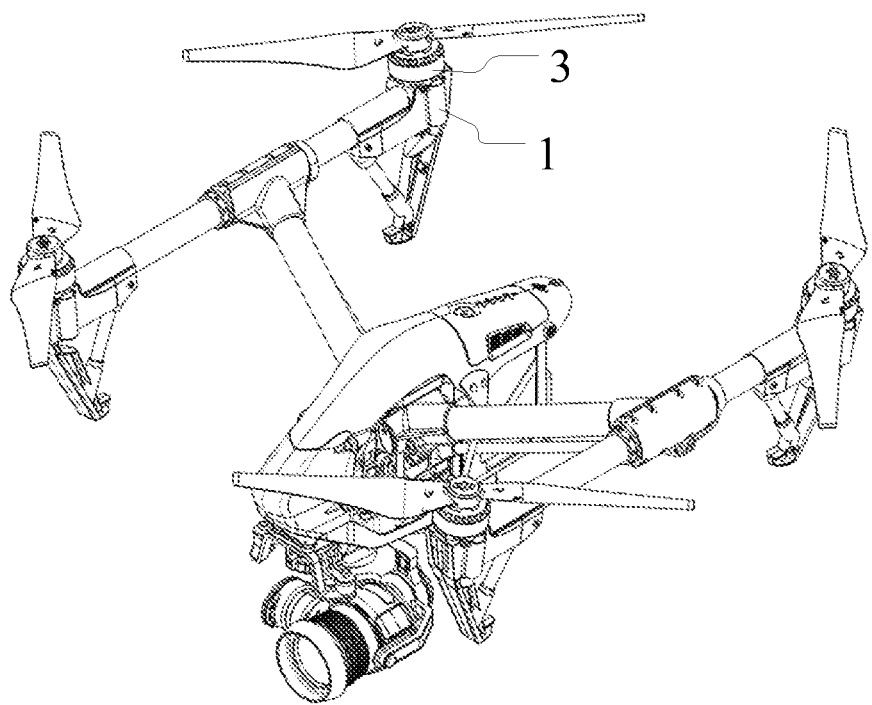
FIG. 9 is a schematic structural diagram of a mobile platform according to an exemplary embodiment of the present disclosure.

FIG. 9 is a schematic structural diagram of an exemplary mobile platform consistent with embodiments of the present disclosure. The mobile platform shown in FIG. 9 is an unmanned aircraft. In some other embodiments, the mobile platform may be a camera gimbal, a remotely controlled fighting vehicle, or another device. FIG. 9 is only for illustrating the structure of a mobile platform as an example.

As shown in FIG. 9, the mobile platform provided in this embodiment includes a motor 3, a controller (not shown), and an electronic speed regulator 1. The motor 3 is coupled to the electronic speed regulator 1. A throttle channel for transmitting a throttle control signal and a communication channel for transmitting communication data are arranged between the electronic speed regulator 1 and the controller. The controller can transmit a throttle control signal to the electronic speed regulator 1 via the throttle channel. The electronic speed regulator 1 can receive the throttle control signal via the communication channel when the signal transmission state of the throttle channel is an abnormal state.

The mobile platform in this embodiment may be used in performing a method for processing throttle control signal consistent with embodiments of the disclosure, such as the exemplary method described above in connection with FIG. 6. The functions and the implementations of individual component of the mobile platform in this embodiment are similar to those described above in connection with FIG. 6, and thus detailed description thereof is omitted.

The mobile platform provided in this embodiment includes a motor 3, a controller, an electronic speed regulator 1, and a throttle channel for transmitting a throttle control signal and a communication channel for transmitting communication data arranged between the electronic speed regulator 1 and the controller. The electronic speed regulator 1 may receive the throttle control signal via the communication channel when the signal transmission state of the throttle channel is an abnormal state, so as to maintain proper control over the rotation of the motor 3, preventing the aircraft from losing control over its frame arm dynamics, thereby ensuring the normal flight of, and improving the reliability of, the aircraft.

In some embodiments, the abnormal state may be that no throttle control signal is received via the throttle channel, or the throttle control signal received via the throttle channel exhibits abnormality.

In some embodiments, the electronic speed regulator 1 may determine whether the throttle control signal received via the throttle channel is abnormal according to whether the characteristic information of the throttle control signal received via the throttle channel satisfies a predefined condition.

In some embodiments, the characteristic information may include frequency information and/or pulse width information of the throttle control signal.

In some embodiments, if the signal transmission state is an abnormal state, the electronic speed regulator 1 may transmit a throttle control signal transmission fault message to the controller via the communication channel. Correspondingly, the controller may transmit the throttle control signal to the electronic speed regulator 1 via the communication channel based on the throttle control signal fault message.

In some embodiments, the throttle control signal may be simultaneously and separately transmitted in parallel via the throttle channel and the communication channel.

In some embodiments, the throttle control signal may be transmitted to the throttle channel and the communication channel in different forms. For example, the throttle control signal may be transmitted to the throttle channel in an analog signal format, and be transmitted to the communication channel in a digital signal format.

In some embodiments, the electronic speed regulator 1 may receive the throttle control signal via the throttle channel if the signal transmission state of the throttle channel is back to normal.

In the several embodiments provided in the present disclosure, it should be understood that, the disclosed device and method involved may be implemented in other manners. For example, the device embodiments described above are merely illustrative, e.g., the modules or units are categorized according to logical functions only, and other categories can be used in actual implementations. For instance, multiple units or components may be combined or integrated into another system, or some features can be omitted or skipped. Moreover, an illustrated or discussed coupling or direct coupling or communication connection may be an indirect coupling or communicative connection an interface, device or unit, and may be in electrical, mechanical, or another form.

The above descriptions are merely examples of, rather than limitations on, the scope of this disclosure. Therefore, any and all equivalent structure or equivalent process alternations made by leveraging contents in the description and drawings of this disclosure, or direct or indirect application thereof in other relevant technical fields, are included in the scope of this disclosure.

The units described as separate members may be or may not be physically separated. The members shown as units may be or may not be physical units, and may be located at the same place or may be distributed in multiple network units. Some or all of the elements may be selected according to the actual needs for realizing the objectives of the solutions of the embodiments.

In addition, various functional units in various embodiments of the present disclosure may be integrated into a single processing unit, or each unit may be presented in physically separated forms, or two or more units may be integrated into a single unit. The above-mentioned integrated unit can be implemented in the form of hardware or a software functional unit.

The integrated unit may, if implemented in a form of a software functional unit and marketed or used as a stand-alone product, be stored in a computer-readable storage medium. All or part of the technical solution consistent with embodiments of the disclosure may be embodied in the form of a software product. The computer software product may be stored in a storage medium, and may include a number of instructions that can cause a computer processor to carry out entire or part of a method consistent with embodiments of this disclosure, such as one of the exemplary methods described above. The storage medium described above may include a USB disk, a mobile hard disk, a read-only memory (ROM), a random access memory (RAM), a magnetic disk, an optical disk, or the like, which can store program code.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

The invention claimed is:

1. A method for processing a throttle control signal, comprising:
   receiving, from a controller, the throttle control signal via a throttle signal interface of an electronic speed regulator, the electronic speed regulator being configured to control rotation of a motor according to the throttle control signal;
   communicating with the controller via a communication interface between the electronic speed regulator and the controller to:
      receive, from the controller, data for the electronic speed regulator to implement firmware upgrade or parameter modification, and
      transmit, to the controller, operation data of an operation state of the motor or an operation state of the electronic speed regulator;
   monitoring, in real time, a signal transmission state of the throttle signal interface of the electronic speed regulator;
   determining that the signal transmission state is abnormal; and
   receiving the throttle control signal via the communication interface of the electronic speed regulator in response to the signal transmission state being determined to be abnormal.

2. The method according to claim 1, wherein determining that the signal transmission state is abnormal includes determining that the signal transmission state is abnormal in response to no throttle control signal being received via the throttle signal interface or the throttle control signal received via the throttle signal interface being abnormal.

3. The method according to claim 2, wherein determining that the throttle control signal received via the throttle signal interface is abnormal includes determining that characteristic information of the throttle control signal received via the throttle signal interface meets a predefined condition.

4. The method according to claim 3, wherein determining that the characteristic information meets the predefined condition includes determining that at least one of a frequency or a pulse width of the throttle control signal meets the predefined condition.

5. The method according to claim 1, further comprising:
   transmitting a throttle control signal transmission fault message via the communication interface if the signal transmission state is abnormal.

6. The method according to claim 1, further comprising:
   receiving the throttle control signal simultaneously and separately in parallel via the throttle signal interface and the communication interface.

7. The method according to claim 1, wherein receiving the throttle control signal via the communication interface includes receiving the throttle control signal via the communication interface in a signal format different from a signal format of the throttle control signal when received via the throttle signal interface.

8. The method according to claim 7, wherein monitoring the signal transmission state of the throttle signal interface includes monitoring a transmission state of the throttle control signal transmitted via the throttle signal interface in an analog signal format.

9. The method according to claim 7, wherein receiving the throttle control signal via the communication interface includes receiving the throttle control signal via the communication interface in a digital signal format.

10. The method according to claim 1, further comprising:
    restoring receipt of the throttle control signal via the throttle signal interface when the signal transmission state of the throttle signal interface returns to normal.

11. An electronic speed regulator, comprising:
    a throttle signal interface configured to receive a throttle control signal from a controller, the electronic speed regulator being configured to control rotation of a motor according to the throttle control signal;
    a communication interface between the controller and the electronic speed regulator and configured to:
       receive, from the controller, data for the electronic speed regulator to implement firmware upgrade or parameter modification, and
       transmit, to the controller, operation data of an operation state of the motor or an operation state of the electronic speed regulator;
    a monitoring circuit configured to monitor, in real time, a signal transmission state of the throttle signal interface; and
    a processor configured to receive the throttle control signal via the communication interface in response to the signal transmission state detected by the monitoring circuit being abnormal.

12. The electronic speed regulator according to claim 11, wherein the processor, the monitoring circuit, the throttle signal interface, and the communication interface are integrated together.

13. The electronic speed regulator according to claim 11, wherein the processor, the monitoring circuit, the throttle signal interface, and the communication interface are provided separately.

14. The electronic speed regulator according to claim 11, wherein the processor is configured to determine that the signal transmission state is abnormal when no throttle control signal is received via the throttle signal interface or when the throttle control signal received via the throttle signal interface is abnormal.

15. The electronic speed regulator according to claim 14, wherein the processor is configured to determine that the throttle control signal received via the throttle signal interface is abnormal when characteristic information of the throttle control signal received via the throttle signal interface meets a predefined condition.

16. The electronic speed regulator according to claim 15, wherein the characteristic information includes at least one of a frequency or a pulse width of the throttle control signal.

17. The electronic speed regulator according to claim 11, wherein the processor is further configured to transmit a throttle control signal transmission fault message via the communication interface when the signal transmission state is abnormal.

18. A mobile platform, compromising:
    a motor;
    a controller;
    an electronic speed regulator coupled to the motor;
    a throttle channel between the controller and the electronic speed regulator for transmitting a throttle control signal from the controller to the electronic speed regulator, the electronic speed regulator being configured to control rotation of the motor according to the throttle control signal; and
    a communication channel between the electronic speed regulator and the controller and configured to:
       receive, from the controller, data for the electronic speed regulator to implement firmware upgrade or parameter modification, and transmit, to the controller, operation data of an operation state of the motor or an operation state of the electronic speed regulator, wherein the electronic speed regulator is configured to receive the throttle control signal via the communication channel in response to a signal transmission state of the throttle channel being abnormal.

19. The mobile platform according to claim 18, wherein the mobile platform includes an unmanned aircraft, a camera gimbal, or a remotely controlled vehicle.

20. The mobile platform according to claim 18, wherein the signal transmission state is abnormal when no throttle control signal is received via the throttle channel or when the throttle control signal received via the throttle channel is abnormal.

* * * * *